US012803289B2

(12) United States Patent

Belur et al.

(10) Patent No.: US 12,803,289 B2
(45) Date of Patent: Nov. 17, 2026

(54) METHOD AND APPARATUS FOR PROVIDING COORDINATED CONTROL OF DISTRIBUTED ENERGY RESOURCES

(71) Applicant: Enphase Energy, Inc., Petaluma, CA (US)

(72) Inventors: Raghuveer R. Belur, Los Altos, CA (US); John Scott Berdner, Grass Valley, CA (US); Christiaan Johannes Van Antwerpen, Mountain View, CA (US)

(73) Assignee: Enphase Energy, Inc., Petaluma, CA (US)

( * ) Notice: Subject to any disclaimer, the term of this patent is extended or adjusted under 35 U.S.C. 154(b) by 474 days.

(21) Appl. No.: 18/224,943

(22) Filed: Jul. 21, 2023

(65) Prior Publication Data

US 2024/0170971 A1 May 23, 2024

Related U.S. Application Data

(60) Provisional application No. 63/427,205, filed on Nov. 22, 2022.

(51) Int. Cl.
*H02J 3/38* (2026.01)
*H02J 101/24* (2026.01)

(52) U.S. Cl.
CPC ........... *H02J 3/381* (2013.01); *H02J 2101/24* (2026.01)

(58) Field of Classification Search
CPC .............................. H02J 3/381; H02J 2300/24
See application file for complete search history.

(56) References Cited

U.S. PATENT DOCUMENTS

| | | | | |
|---|---|---|---|---|
| 2016/0028235 | A1 | 1/2016 | Sun | |
| 2016/0118795 | A1 | 4/2016 | Berkowitz et al. | |
| 2017/0194814 | A1* | 7/2017 | Chakraborty | G05B 13/021 |
| 2018/0366953 | A1* | 12/2018 | DeTommasi | H02J 3/004 |
| 2019/0020220 | A1* | 1/2019 | Lian | H02J 13/00 |
| 2020/0381940 | A1* | 12/2020 | Hong | H02J 13/00028 |
| 2022/0109303 | A1 | 4/2022 | Srinivasan | |
| 2022/0244076 | A1 | 8/2022 | Karlgaard | |
| 2023/0223758 | A1* | 7/2023 | Quan | B60L 53/63 307/9.1 |

FOREIGN PATENT DOCUMENTS

| | | | |
|---|---|---|---|
| EP | 2630771 | B1 | 2/2022 |
| JP | 2017-011968 | A | 1/2017 |

OTHER PUBLICATIONS

PCT International Search Report and Written Opinion for application No. PCT/US2023/035678 dated Feb. 19, 2024, 11 pgs.

* cited by examiner

*Primary Examiner* — Charles Cai
(74) *Attorney, Agent, or Firm* — Moser Taboada

(57) ABSTRACT

A method and apparatus for managing distributed energy resources (DER) comprising a plurality of DER systems located behind a grid infrastructure transformer which form a DER group, and a coordinated DER controller configured to monitor parameters of the plurality of DER systems, negotiate a value for transferring energy from one DER system to another DER system, and control the plurality of DER systems based upon the parameters and the negotiation.

20 Claims, 5 Drawing Sheets

METHOD AND APPARATUS FOR PROVIDING COORDINATED CONTROL OF DISTRIBUTED ENERGY RESOURCES

RELATED APPLICATION

This application claims benefit to U.S. Provisional patent application Ser. No. 63/427,205 filed 22 Nov. 2022 entitled "Method and Apparatus for Providing Coordinated Control of Distributed Energy Resources," which is hereby incorporated herein by reference in its entirety.

BACKGROUND

Field

Embodiments of the present invention generally relate to distributed energy production and consumption systems (i.e., distributed energy resources) and, in particular, to a method and apparatus for providing control of distributed energy resources.

Description of the Related Art

A solar energy generation and storage system (Distributed Energy Resources (DERs)) typically comprises a number of components including, but not limited to, a plurality of energy sources (e.g., solar panel and related power inverters), a storage element (e.g., battery system), loads (e.g., appliances) and a service panel to connect the DER to the utility power grid. The solar panels are arranged in an array and positioned to maximize solar exposure. Each solar panel or small groups of panels may be coupled to an inverter (so-called micro-inverters), or all the solar panels may be coupled to a single inverter. The inverter(s) convert the DC power produced by the solar panels into AC power. The AC power is coupled to the service panel for use by a facility (e.g., home or business), supplied to the power grid, and/or coupled to a storage element such that energy produced at one time is stored for use at a later time. Storage elements may be one or more of batteries, fly wheels, hot fluid tank, hydrogen storage or the like. The most common storage element is a battery pack (i.e., a plurality of battery cells) having one or more bidirectional inverters coupled to the service panel to supply the batteries with DC power as well as allow the batteries to discharge through the inverter(s) to supply AC power to the facility when needed.

In addition, a number of components within a DER consume the generated power, e.g., load or consumption components such as appliances, electric vehicles, etc. Typically, the DER may be controlled by a controller to control loads and sources to locally balance energy production and consumption. Each electrical area locally operates without regard for neighboring electrical areas (neighboring homes and businesses having controlled DERs). As such, although an individual electrical area may operate properly and efficiently, over an entire region comprising many electrical areas, the region may not optimally operate, i.e., energy may be wasted or energy production within a region may not be maximized.

In addition, power utilities treat each DER as an individual element of the power system and apply limits on the amount of power each DER may export to the power grid. Typically, a utility defines a Power Control System (PCS) which includes a Power Export Limit (PEL) that is assigned to each DER to ensure that the grid is not compromised by too much energy being exported to the grid. These limits may impact the efficiency and operation of DERs within an electrical area.

Therefore, there is a need for a method and apparatus for providing coordinated control of distributed energy resources.

SUMMARY

A method and apparatus for providing coordinated control of distributed energy resources is provided substantially as shown in and/or described in connection with at least one of the FIGURES, as set forth more completely in the claims.

Various features and advantages of the present disclosure may be appreciated from a review of the following detailed description of the present disclosure, along with the accompanying FIGURES in which like reference numerals refer to like parts throughout.

BRIEF DESCRIPTION OF THE DRAWINGS

So that the manner in which the above recited features of the present invention can be understood in detail, a particular description of the invention, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
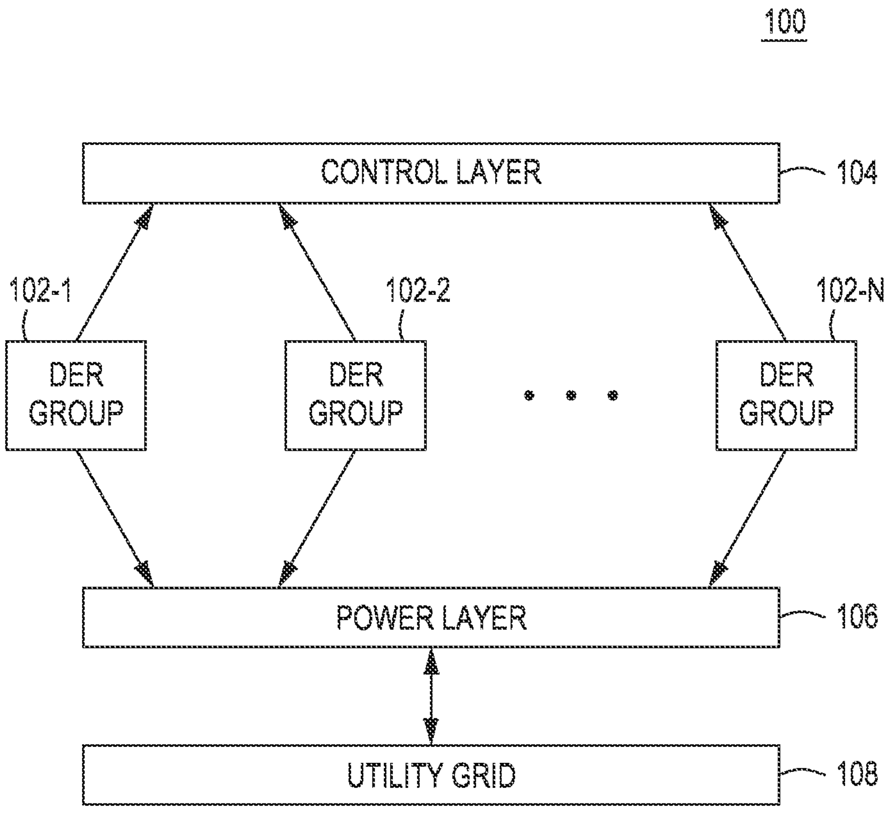
FIG. 1 depicts a block diagram of a distributed energy resource coordinated control system architecture in accordance with at least one embodiment of the invention.

Embodiments of the present invention comprise apparatus and methods for providing coordinated control of distributed energy resources (DERs). Embodiments of the invention comprise defining DER groups (e.g., including groups of homes, business, apartment complexes, housing complexes, etc.), where each DER system within a DER group contains at least one local DER controller coupled to at least one load (e.g., electric appliances, electric vehicles, electric machinery, etc.) and at least one power producing asset (e.g., electric storage, solar panels, wind turbines, fuel cells, etc.). Since electric storage and electric vehicles may extract energy for storage as well as disgorge energy, these components may be viewed as behaving as both load and production assets. A DER group typically comprises a plurality of DERs that are connected to the utility power grid via a single transformer (e.g., a plurality of homes in a neighborhood that are connected to one another via the utility power grid infrastructure behind a transformer). The local DER controller(s) of DERs within a given group are capable of communicating to a DER coordinated controller (s). As such, local DER controllers communicate their electricity consumption and production information to the DER coordinated controller to ensure that the DERs within each group and the groups themselves cooperate to optimize the power generation and consumption as well as optimize a value of the generation/consumption to the DER owner. In addition to the consumption and production information, minimum and maximum values (e.g., tariffs) may be established by an owner (or other system user) that define a value that the owner will accept for transferring energy to/from their DER system. Collectively, the consumption and production information and the value information are referred to herein as parameters of a DER system. For example, optimizing value to the DER owner may concern charging and discharging storage when electricity prices (tariffs) paid by the utility or a neighboring DER system are optimal (high tariff for discharging, low tariff for charging). Other parameters may include maintaining a particular level of EV charge, prioritizing exchanging power with neighboring DERs to avoid buying energy from the grid, and so on.

In one exemplary embodiment of the invention, the individual local DER controllers communicate energy production and consumption information to the DER coordinated controller. In addition, the owners and/or users of the individual DER systems may provide parameters regarding their acceptance of financial incentives and the level of incentive that is acceptable. For example, a user may indicate a specific level of financial incentive that they will accept to store energy provided by another DER system in their group. In another example, the user may indicate a specific level of financial incentive they will accept to not charge their EV at a particular time of day. Incentives may be financial (e.g., cash payments) or non-financial (e.g., energy swap) and generally concern load shedding, energy production, energy storage, and, generally, the time, duration and level of consuming, producing or storing energy, etc.

Although the DER coordinated controller is described in one embodiment as a centralized controller, in other embodiments, the DER coordinated controller may be implemented as distributed software that resides in each DER site as, for example, an element of the local DER controllers that interoperates according to a common communications scheme, or it may be a single controller in one of the sites, even a neighborhood "pseudo-utility" device, or in the cloud.

[owls] Additionally, such coordinated DER operation within an electrical area behind a grid connection point (e.g., a transformer) enables the utility to relax PCS constraints on individual DERs. In one embodiment, the utility is able to establish a "transformer-level PCS" (or "transformer PCS") for an electrical area rather than, or in conjunction with, individual DER-level PCS. Consequently, the utility protects the grid from instability at the transformer or at other locations remote from the site but allows the individual DERs to transfer energy amongst themselves or to local loads to meet the needs of the electrical area without constraining, or with only limited constraints, on the energy produced by individual DERs. The transformer PCS value may be used by the DER coordinated controller to ensure energy is transferred to/from individual DERS, but ensures energy being exported to the grid via the transformer is limited to ensure grid stability. The PCS transformer limit may be time variant according to established schedules or based on signals communicated from other assets on the grid or from the utility itself.

FIG. 1 depicts a high-level block diagram of energy production and consumption system 100 comprising a plurality of DER groups 102-1, 102-2, . . . 102-N (where N is an integer) that are coupled to a control layer 104 and a power layer 106. The power layer 106 is coupled to a utility power grid 108 (i.e., the utility owned infrastructure for supplying energy to homes and businesses). The control layer 104 is designed to provide coordinated control of the DER groups 102. The power layer 106 comprises transmission infrastructure to facilitate inter- and intra-DER group 102 communications and energy transfer. Typically, the DER systems within a DER group 102 are located behind a transformer within the utility grid power transmission infrastructure.

Figure 2:
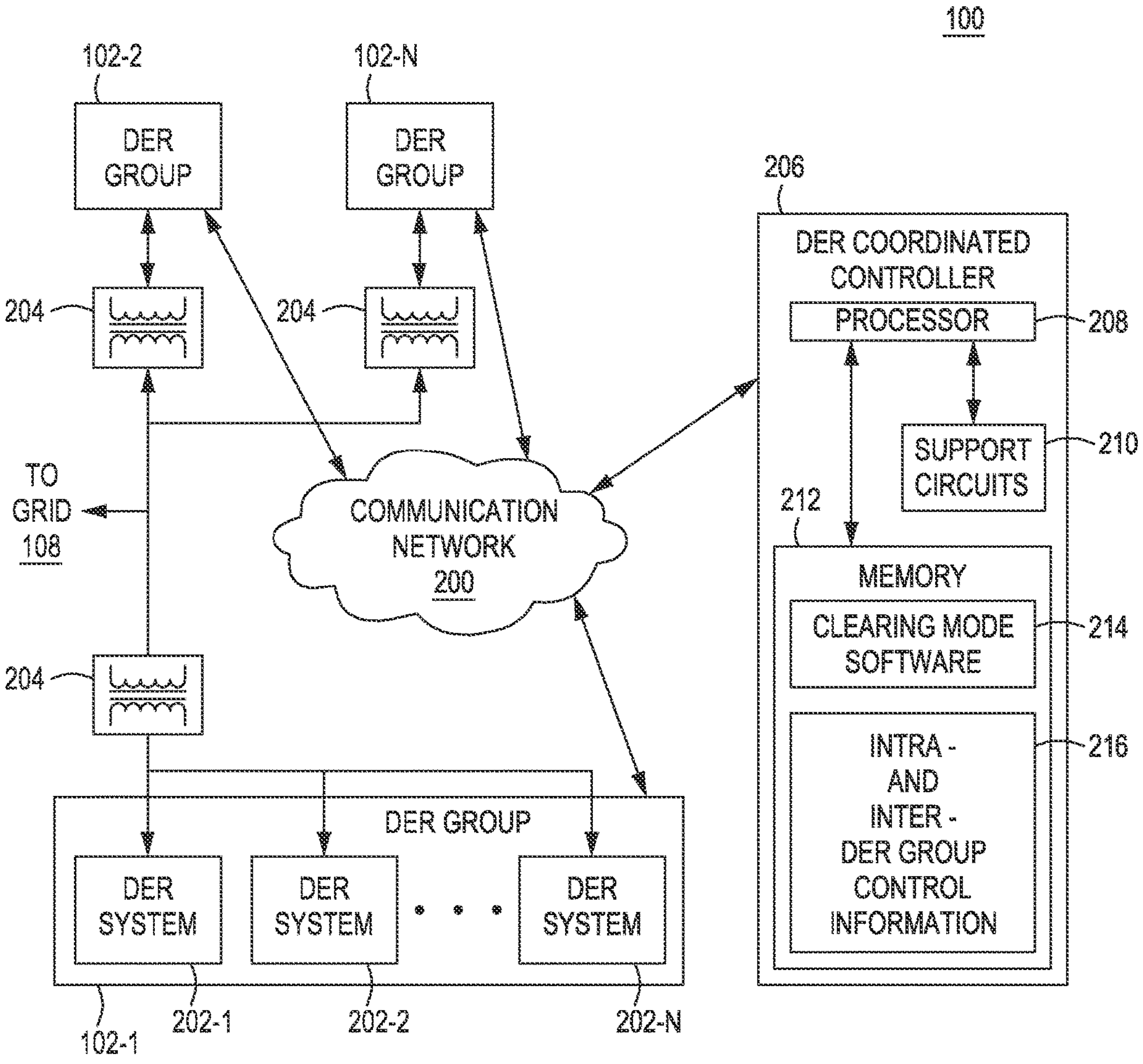
FIG. 2 depicts a block diagram of a distributed energy resource coordinated control system in accordance with at least one embodiment of the invention.

FIG. 2 depicts a detailed block diagram of energy production and consumption system 100 comprising a plurality of DER groups 102 coupled to one another via a communications network 200 (e.g., the Internet also known as the cloud) and the power grid 108. Each group 102 comprises at least one DER system 202-1, 202-2, . . . 202-N (where N is an integer) that are located behind a transformer 204 of the grid 108. A DER coordinated controller 206 is coupled to the communications network 200 such that it communicates with the DER groups 102 and their constituent DER systems 202.

The controller 206 comprises at least one processor 208, support circuits 210 and memory 212. The at least one processor 208 may be any form of processor or combination of processors including, but not limited to, central processing units, microprocessors, microcontrollers, field programmable gate arrays, graphics processing units, and the like capable of executing software instructions to cause the controller to perform the functions described herein. The support circuits 210 may comprise well-known circuits and devices facilitating functionality of the processor(s). The support circuits 210 may comprise one or more of, or a combination of, power supplies, clock circuits, communications circuits, cache, displays, and/or the like. The support circuits 210 facilitate communications with the DER groups 102 via the communications network 200.

The memory 212 comprises one or more forms of non-transitory computer readable media including one or more of, or any combination of, read-only memory or random-access memory. The memory 212 stores software and data including, for example, clearing house software 214 and extra-, intra- and inter-DER group control information 216 (which may include transformer PCS parameters). The clearing house software 214 may comprise software instructions that, when executed by the processor 208, cause the controller to monitor the status of the DER systems 202 and groups 102. Details of the operation of the software 214 is described with respect to FIGS. 3 and 4 below.

The DER coordinated controller 206 communicates with DER systems 202 within the DER groups 102 to monitor various parameters regarding the current operational state of the DER systems 202. For example, the controller 206 monitors the amount of power being generated, stored and/or consumed by the DER groups 102 as well as receives acceptable value information that may be used to negotiate energy transfer amongst DER systems within DER groups (intra-DER transfers) or between DER groups (inter-DER transfers). Information (parameters) regarding the operation of the DER groups 102 is shared with the DER coordinated controller 206 via messages sent through the communications network 200.

The parameters that are shared with DER coordinated controller 206 may comprise at least one of an amount of energy being produced, amount of energy being stored, amount of energy being consumed, state of charge regarding energy storage, state of charge of electric vehicles, near-term projections of energy production or consumption, etc. In addition, the controller 206 receives utility electricity pricing (tariffs). In response to receiving analyzing the DER information 216, the controller 206 may alter the behavior of its associated DER systems 202 to meet value parameters defined by DER owners. The details of the structure and operation of the DER systems 202 and DER groups 102 are described with respect to FIGS. 3, 4 and 5 below.

Although the DER coordinated controller 206 is described in the above embodiment as a centralized controller, in other embodiments, the DER coordinated controller 206 may be implemented as distributed software that resides in each DER site as, for example, an element of the local DER controllers that interoperates according to a common communications scheme, or it may be a single controller in one of the sites, even a neighborhood "pseudo-utility" device, or in the cloud.

Figure 3:
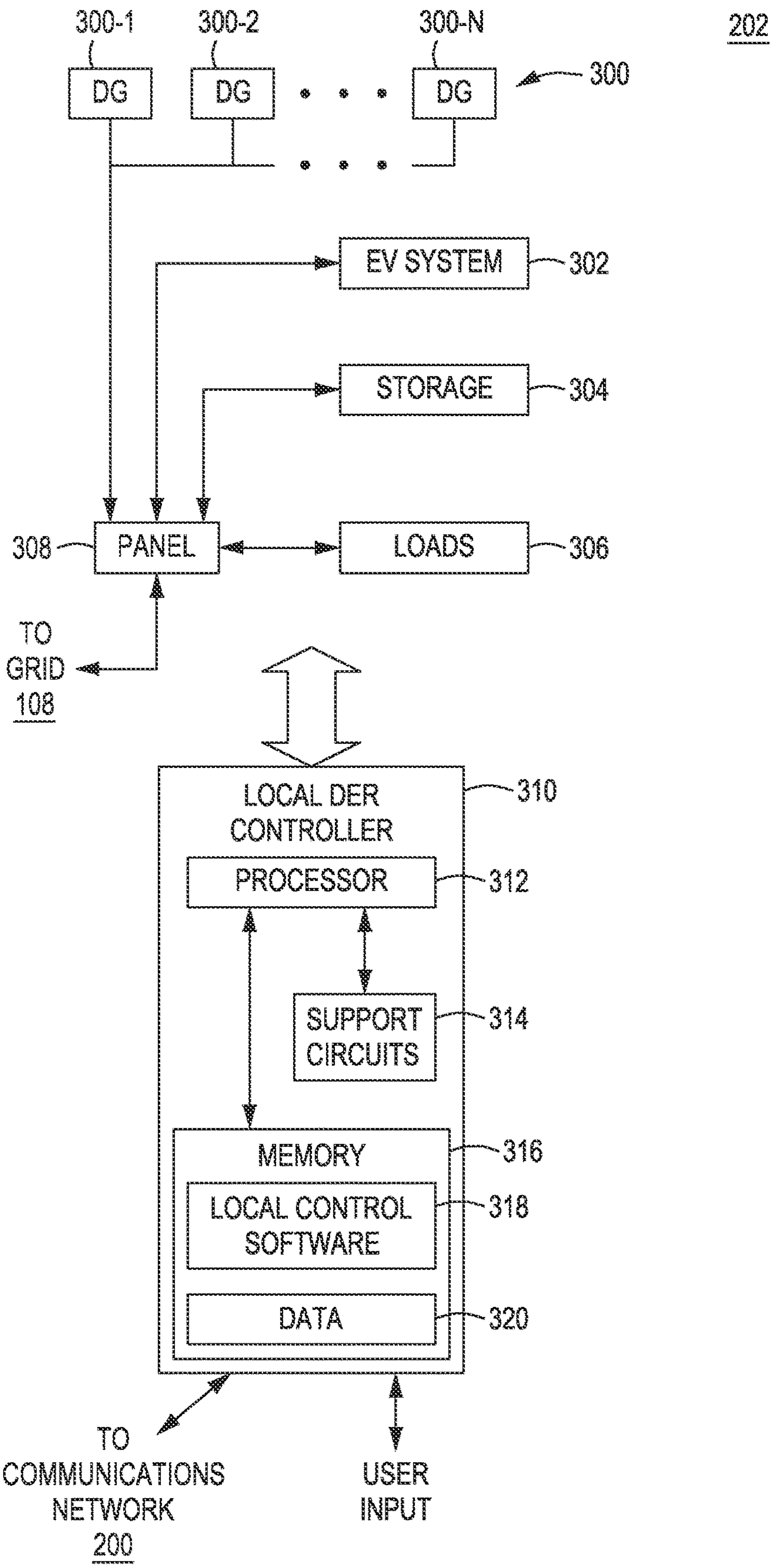
FIG. 3 depicts a block diagram of a distributed energy resource that is controlled by the system of FIG. 2 in accordance with at least one embodiment of the invention.

FIG. 3 depicts a block diagram of a distributed energy resource (DER) system 202 that is controlled by the DER coordinated controller 206 of FIG. 2 in accordance with at least one embodiment of the invention. The DER system 202 comprises a plurality of distributed generators 300-1, 300-2, . . . 300-N (collectively referred to as DGs 300) such as a solar system (e.g., solar panels coupled to one or more inverters, wind turbines, fuel cells, etc.) and storage devices 304 (e.g., battery, thermal, kinetic, etc.). A service panel 308 couples the DGs 300 and storage 304 to one another. The service panel 206 is also coupled to a plurality of loads 306. The loads 306, in a residential application, may comprise washer, dryer, refrigerator, air conditioner, hot water heater, electric vehicle charger, and/or any other electricity consuming device in the household. The loads 306, in an industrial application, may comprise electric motors, heating systems, air conditioning systems, refrigerators, freezers, and/or any other electricity consuming device generally used in an industrial setting. The DER system 202 may also include one or more electric vehicle (EV) systems 302, e.g., one or more charging stations and associated vehicles. The service panel 308 may also be coupled to the power grid 108, such that, energy may be consumed from the grid 108 or sourced to the grid 108, as necessary. Alternatively, as is described in detail below, the service panel may include or may be replaced by and energy management device (e.g., a smart switch) that controls the flow of energy throughout the DER system 202.

In one embodiment, a distributed generator 300 having a single solar panel coupled to a single inverter (i.e., micro-inverter), this description is not meant to limit the scope of the invention. For example, embodiments of the invention may also be used with distributed generators having a plurality or more solar panels coupled to one or more inventers. In other system, the distributed generator may be formed by solar panels that are each coupled to a DC optimizer and the optimizers are coupled to at least one inverter to produce AC power. Furthermore, distributed generators may include other forms of energy generation such as wind turbines arranged on a so-called "wind farm," fuel cells, micro-hydroelectric generators, fossil-fuel power generators, or the like. Similarly, energy storage in a battery-based storage system is described as an example of the type of storage whose capacity is estimated using embodiments of the invention; however, other forms of energy storage may be used such as fly wheel(s), hot fluid tank(s), hydrogen storage system(s), pressurized gas storage system(s), pumped storage hydropower, fuel cells, or the like.

Since electric storage and EVs both extract energy from the system for storage as well as disgorge energy to the system, they may be considered to be both a DG and a load depending on their current operational status. When charging, EVs and storage are considered energy consuming devices (loads) and, when discharging into the system, they may be considered to be distributed generators.

A local DER controller 310 is also coupled to the loads 306, storage 304, EV system 302 and/or DGs 300 to monitor the operational state of each DER system component. The local DER controller 310 may be connected directly to each component, coupled indirectly to each component via the service panel 308, or coupled both indirectly and directly. Such communication may occur through wireless or wired connections such as power line communications (PLC), WiFi, ZigBee, Bluetooth, and the like, or a combination thereof.

The local DER controller 310 comprises at least one processor 312, support circuits 314 and memory 316. The at least one processor 312 may be any form of processor or combination of processors including, but not limited to, central processing units, microprocessors, microcontrollers, field programmable gate arrays, graphics processing units, and the like capable of executing software instructions to cause the controller to perform the functions described herein. The support circuits 314 may comprise well-known circuits and devices facilitating functionality of the processor(s). The support circuits 314 may comprise one or more of, or a combination of, power supplies, clock circuits, communications circuits, cache, displays, and/or the like. The support circuits facilitate communications with the loads 306, storage 304, EV system 302, DGs 300 and/or service panel 308 as well as the communications network 200.

The memory 316 comprises one or more forms of non-transitory computer readable media including one or more of, or any combination of, read-only memory or random-access memory. The memory 316 stores software and data including, for example, local control software 318 and data 320. The local control software 318 may comprise software instructions that, when executed by the processor 312, cause the controller 310 to monitor the status of the loads 306, storage 304, EV system 302, DGs 300, service panel 308 and/or grid 108 (i.e., the DER system components) as well as share information with other controllers in other DER groups and the DER coordinated controller. The local control software 318 accesses and stores the DER system component status information and stores the information as data 320. The local control software 318 also determines, based on the status information and messages from other local controllers and the DER coordinated controller, how to control the DER system components in the controller's group 102. The local control software may operate on a rule driven basis or may use machine learning. Details of the operation of the local control software 318 is described with respect to FIG. 4 below.

The local DER controller 310 may incorporate a plurality of DER control points located within the facility. Where a plurality of control points are utilized, the DER controller 310 may use a hierarchical control structure to prevent the settings at any DER control point from creating an overload on any other conductor or busbar managed by the DER controller 310. Some of the control points may include points of connection to the utility grid. The DER controller 310 may use DER-level PCS information and transformer-level PCS information to control power limits at the utility grid connections and/or transformer connection. In some embodiments, control points may be at locations on the utility grid and communicated to the DER controller using various methods and protocols (i.e., the DER controller may use information from sources that are remote from the DERs).

Figure 4:
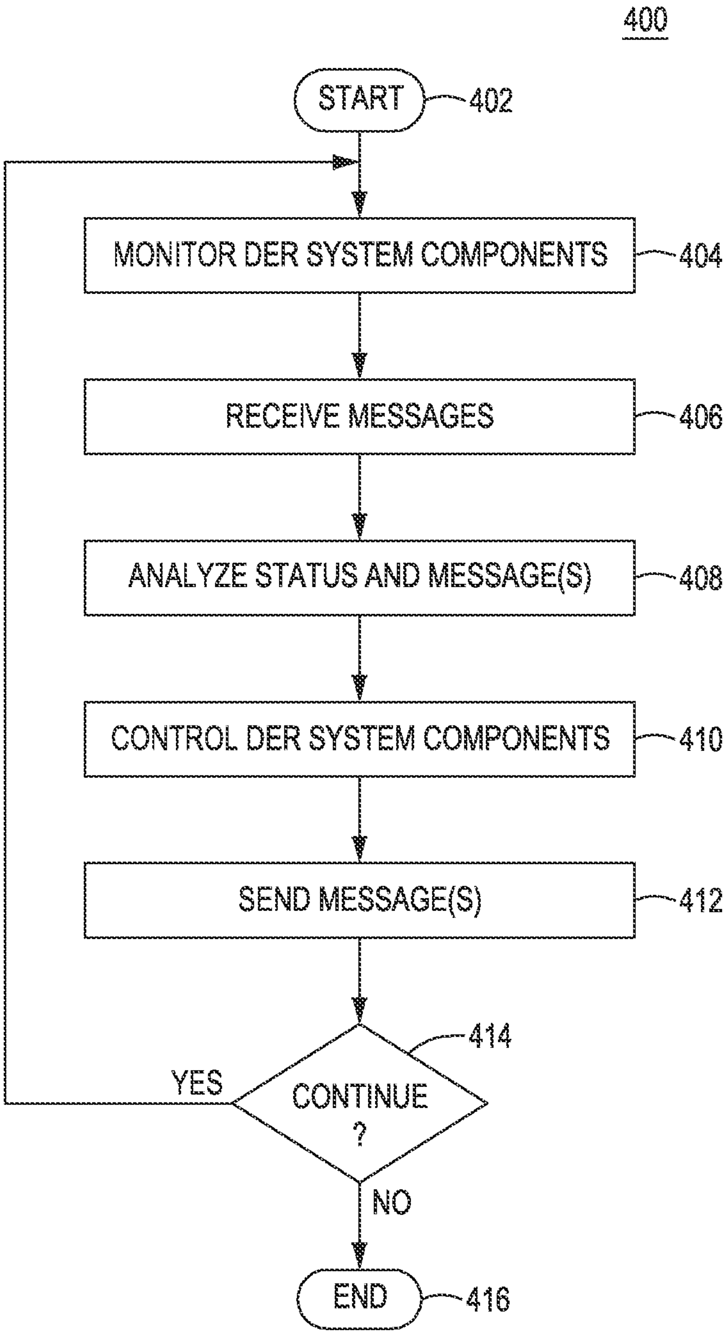
FIG. 4 depicts a flow diagram of operation of the DER system of FIG. 2 in accordance with at least one embodiment of the invention.

FIG. 4 depicts a flow diagram of a method 400 of operation of the local control software 318 when executed by the processor(s) of a local controller 310 in accordance with at least one embodiment of the invention. Each block of the flow diagrams below may represent a module of code to execute and/or combinations of hardware and/or software configured to perform one or more processes described herein. Though illustrated in a particular order, the following figure is not meant to be so limiting. Any number of blocks may proceed in any order (including being omitted) and/or substantially simultaneously (i.e., within technical tolerances of processors, etc.) to perform the operations described herein.

FIG. 4 depicts a method 400 that begins at 402 and proceeds to 404 where the method 400 monitors the state of the DER system components that are coupled to the local controller. The state information (parameters) may comprise at least one of an amount of energy being produced, amount of energy being stored, amount of energy being consumed, state of charge regarding energy storage, state of charge of electric vehicles, near-term projections of energy production or consumption, state of the grid, acceptable value and terms for energy exchange, etc.

At 406, the method 400 receives one or more message(s) from other local DER systems or from the coordinated controller. These messages may contain status information, requests from the coordinated controller or other DER systems for the local DER controller to control a DER system component in a certain manner, negotiation messages from the coordinated controller, and the like. All command and control decisions are made within a DER group or between groups. The decisions are overseen by the DER coordinated controller as described with reference to FIG. 5 below. The decisions involve determining individual DER systems and/or DER groups that will supply energy or consume energy within a group (intra-DER group) or between DER groups (inter-DER groups) without any involvement or interaction with a power utility. However, as mentioned previously, the power utility may establish PCS parameters at the transformer-level to maintain grid stability while facilitating energy exchange amongst DERs.

At 408, the method 400 analyzes the status information of the local DER system components and the contents of the messages (e.g., status of other DER systems and/or information from the DER coordinated controller). Based upon the local DER system component state information, the method 400 makes a preliminary decision regarding the control of the DER system components. The decision process may be rule driven (i.e., given the current state information compared to a predefined set of rules, determine a control decision). Such rule driven decision making may utilize a look up table that uses the state information as input data. For example, an electric vehicle may be charging with a low state of charge (i.e., requiring a large amount of energy) and the storage device may be fully charged. Thus, a local decision may be to utilize the stored energy to charge the vehicle. However, if the vehicle was plugged in for charging at sundown and the stored energy was about to be used for powering other appliances at night, a decision may be to use grid supplied energy to charge the vehicle. Alternatively, the DER coordinated controller may have sent a message to indicate excess energy was available from another DER system within the DER group or in another DER group and that excess energy is available to the local DER system. A negotiation then occurs to establish a tariff (electricity cost) that will be paid by the consumer of the energy to the supplier of energy. In this manner, as described below, the DER coordinated controller operates as a clearinghouse for intra- and inter-DER group energy transactions.

At 410, the method 400 controls the local DER system components in view of the analysis. As such, energy may be supplied to other DER systems or the local DER system may be controlled to consume energy from other DER systems.

At 412, the method 300 sends, as necessary, messages to other local DER controllers or to the DER coordinated controller regarding the state of the local DER components as well as the current control decision. Messages may also be sent to the DER coordinated controller to negotiate the tariff rate for energy to be supplied or consumed by the local DER system. In the example above, because the controller has decided to use grid energy to charge the vehicle, neighboring DER systems within a DER group may want to respond by releasing energy from storage onto the grid or reducing their current use of energy. As such, the grid will not be overloaded by a large number of electric vehicle owners all charging their vehicles at the same time. Also, energy within a DER group may be efficiently transferred amongst DER systems to efficiently utilize locally generated energy rather than rely upon long distance transmission of utility grid energy. In this manner, energy management across a regional portion of the grid is managed in a distributed manner. The size of a regional group may be defined by geography, distance, or by the capacity of the grid itself. Such a group may comprise all the homes located behind a single transformer.

After a message is sent or a decision is made not to send a message, the method 400 queries whether to continue controlling the DER system components. If the query is affirmatively answered, the method 400 returns to 404 to continue monitoring the DER system components. If the query is negatively answered, the method 400 proceeds to 416, where the method 400 ends.

Figure 5:
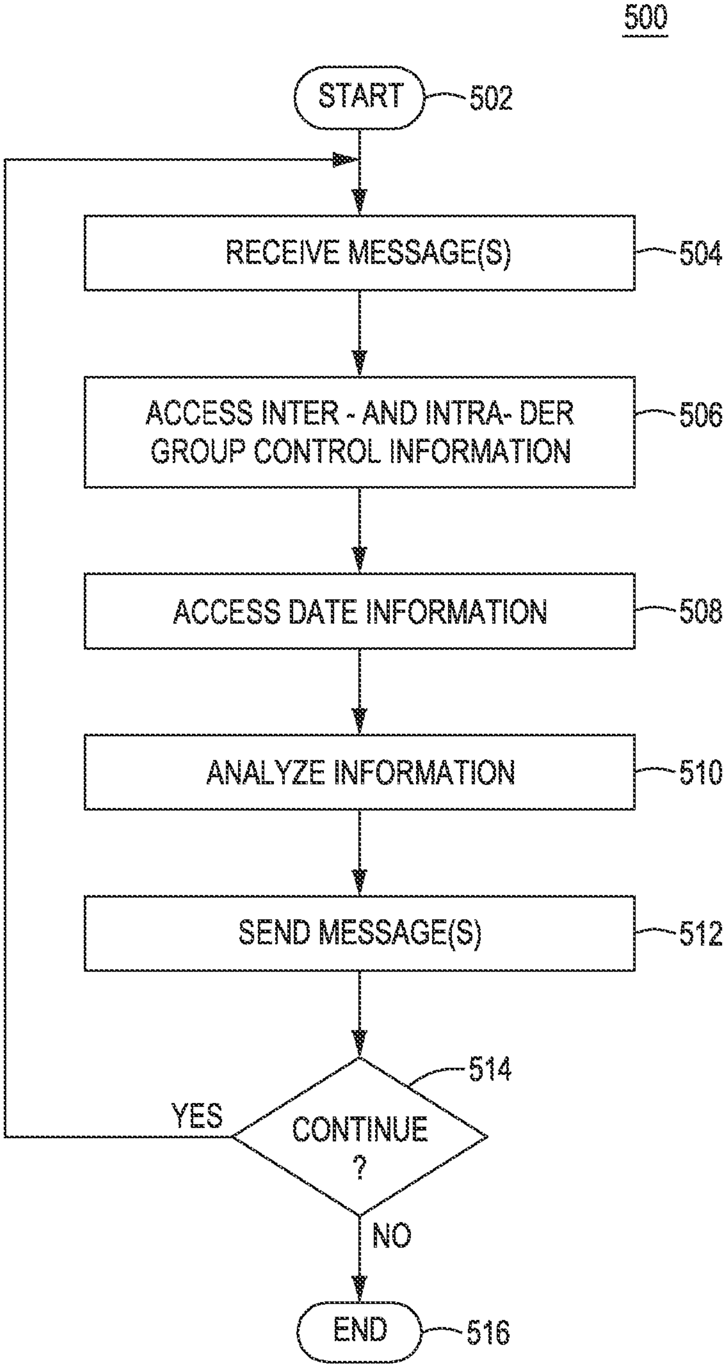
FIG. 5 depicts a flow diagram of operation of a coordinated control clearinghouse method in accordance with at least one embodiment of the invention.

FIG. 5 depicts a flow diagram of a method 500 (i.e., a clearinghouse method) of operation of the clearinghouse software 214 when executed by the processor(s) of a DER coordinated controller 206 in accordance with at least one embodiment of the invention. Each block of the flow diagrams below may represent a module of code to execute and/or combinations of hardware and/or software configured to perform one or more processes described herein. Though illustrated in a particular order, the following figure is not meant to be so limiting. Any number of blocks may proceed in any order (including being omitted) and/or substantially simultaneously (i.e., within technical tolerances of processors, etc.) to perform the operations described herein.

FIG. 5 depicts a method 500 that begins at 502 and proceeds to 504 where the method 500 receives messages from the various DER systems. These messages contain status information of local DER system components as well as negotiation information regarding negotiating tariff rates for energy transfer to and from local DER systems. These messages may also include utility PCS information regarding a transformer-level PCS and may also include DER-level PCS. Collectively, this information is referred to as inter- and intra-DER group control information. The inter- and intra-DER group control information is stored in a database for use by the clearinghouse method 500 in making decisions to control the individual DER systems and/or DER group(s). The information, for each DER system, may comprise at least one of an amount of energy being produced, amount of energy being stored, amount of energy being consumed, state of charge regarding energy storage, state of charge of electric vehicles, near-term projections of energy production or consumption, state of the grid, acceptable value for exchange of energy, transformer and/or DER PCS information, etc.

At 506, the method 500 accesses the extra-, inter- and intra-DER group control information from the database. At 508, the method 500 accesses rate information (i.e., electricity tariff information). The rate information may comprise one or more of, but is not limited to, local utility supplied electricity rate information, selling rates that DER system owners will accept for their locally produced energy, buying rates that DER system owners will accept for their locally produced energy, and the like. The rates may depend upon time, source of the energy (e.g., solar, storage, etc.), amount of energy available within a group or individual DER system, financial incentives provided to sell or buy energy, etc.

At 510, the method 500 analyzes the information, i.e., the inter- and intra-DER group control information and rate information. The analysis involves optimization of energy production and consumption by the DER systems. The clearinghouse method 500 facilitates negotiation amongst DER systems to efficiently transfer energy amongst DER systems. The method 500 determines the value that DER systems will accept for transferring energy to/from the DER systems. From this determination, the method 500 identifies which DER systems shall supply energy to neighboring DER systems within a DER group. In addition, the method 500 can determine which DER groups will transfer energy to the grid for use by other DER groups. As such, in one embodiment, the clearinghouse method may provide joint grid demand balancing and enables energy to be produced and consumed locally or regionally without inefficiently transferring the energy across long distances on the utility grid infrastructure. All transfer of energy is negotiated and exchanged in an autonomous manner with respect to the utility company. However, to ensure grid stability, the method 500 may use the transformer-level PCS to ensure that energy exported to the grid does not destabilize the grid operation (e.g., the amount of energy transferred through a transformer from a DER group is limited by a PEL parameter within the PCS information).

At 512, the method 500 sends at least one message to specific DER system(s) to tell specific DER systems to produce or consume energy in view of the DER systems acceptable tariff level. The local DER controllers process the messages and control the DER system components to produce or consume/store energy to fulfill the overall local grid balancing goals of the clearinghouse technique.

After a message is sent or a decision is made not to send a message or messages, the method 500 queries, at 514, whether to continue the clearinghouse process. If the query is affirmatively answered, the method 500 returns to 504 to continue monitoring the DER system components. If the query is negatively answered, the method 500 proceeds to 516, where the method 500 ends.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, FIGURES are presented herein for illustrative purposes and are not meant to impose any structural limitations, unless otherwise specified. Various modifications to any of the structures shown in the FIGURES are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. Apparatus for managing distributed energy resources (DER) comprising:

a plurality of DER groups comprising a plurality of respective constituent DER systems, where at least a portion of the plurality of respective constituent DER systems are located behind a grid infrastructure transformer; and a coordinated DER controller configured to monitor parameters of the plurality of respective constituent DER systems, negotiate intra-DER energy transfers, which are energy transfers between the plurality of respective constituent DER systems within a first DER group of the plurality of DER groups and inter-DER energy transfers, which are energy transfers between different DER groups, and control the plurality of respective constituent DER systems based upon the parameters and the negotiation, wherein a transformer-level power control system (PCS) value is established and used by the coordinated DER controller to limit the inter-DER energy transfers to ensure grid stability.

2. The apparatus of claim 1, wherein the parameters comprise a transformer-level parameter regarding a limit on the amount of power allowed to pass through the transformer from the DER group.

3. The apparatus of claim 1, wherein each DER system in the plurality of respective constituent DER systems comprises one or more of a solar power generator, an energy storage system, or at least one load.

4. The apparatus of claim 1, wherein each DER system in the plurality of respective constituent DER systems comprises a local DER controller that is communicatively coupled to the coordinated DER controller.

5. The apparatus of claim 4, wherein the coordinated DER controller forms at least a portion of the local DER controller.

6. The apparatus of claim 1, wherein the coordinated DER controller produces an energy transfer clearinghouse.

7. The apparatus of claim 1, wherein the value is based upon utility tariffs and tariffs established for transferring energy from one DER system or another DER system.

8. The apparatus of claim 4, wherein the coordinated DER controller forms at least a portion of the local DER controller.

9. The apparatus of claim 1, wherein the coordinated DER controller produces an energy transfer clearinghouse.

10. The apparatus of claim 1, wherein the value is based upon utility tariffs and tariffs established for transferring energy from one DER system or another DER system.

11. A method of managing distributed energy resources (DER) comprising:

monitoring parameters of a plurality of DER groups comprising respective constituent systems, where at least a portion of the plurality of respective constituent DER systems are located behind a grid infrastructure transformer;

communicating the parameters to a coordinated DER controller that is communicatively coupled to one or more of the DER systems in the plurality of respective constituent DER systems;

controlling the one or more DER systems in the plurality of respective constituent DER systems based upon the parameters; and negotiating via the coordinated DER controller intra-DER energy transfers, which are energy transfers between the plurality of respective constituent DER systems within a first DER group of the plurality of DER groups and inter-DER energy transfers, which are energy transfers between different DER groups, wherein a transformer-level power control system (PCS) value is established and used by the coordinated DER controller to limit the inter-DER energy transfers to ensure grid stability.

12. The method of claim 11, wherein the parameters comprise a transformer-level parameter regarding a limit on the amount of power allowed to pass through the transformer from the DER group.

13. The method of claim 11, wherein each DER system in the plurality of respective constituent DER systems comprises one or more of a solar power generator, an energy storage system, or at least one load.

14. The method of claim 11, wherein each DER system in the plurality of respective constituent DER systems comprises a local DER controller that is communicatively coupled to the coordinated DER controller.

15. The method of claim 14, wherein the coordinated DER controller forms at least a portion of the local DER controller.

16. The method of claim 11, wherein controlling the one or more DER systems produces an energy transfer clearinghouse for transferring energy between the one or more DER systems.

17. The method of claim 11, wherein controlling further comprises:

monitoring parameters of the plurality of respective constituent DER systems;

negotiating a value for transferring energy from one DER system to another DER system; and controlling the plurality of respective constituent DER systems based upon the parameters and the negotiation.

18. The method of claim 17, wherein the value is based upon utility tariffs and tariffs established for transferring energy from one DER system or another DER system.

19. Apparatus for managing distributed energy resources (DER) comprising:

a plurality of DER groups comprising respective constituent systems, where at least a portion of the plurality of respective constituent DER systems are located behind a grid infrastructure transformer and each of the respective constituent DER system in the DER group comprises a local DER controller and one or more of a solar power generator, an energy storage system, or at least one load; and a coordinated DER controller, communicatively coupled to each local DER controller, configured to monitor parameters of the plurality of DER systems, negotiate intra-DER energy transfers, which are energy transfers between the plurality of respective constituent DER systems within a first DER group of the plurality of DER groups and inter-DER energy transfers, which are energy transfers between different DER groups, and control the plurality of respective constituent DER systems based upon the parameters and the negotiation, wherein a transformer-level power control system (PCS) value is established and used by the coordinated DER controller to limit the inter-DER energy transfers to ensure grid stability.

20. The apparatus of claim 19, wherein the parameters comprise a transformer-level parameter regarding a limit on the amount of power allowed to pass through the transformer from the DER group.

* * * * *